United States Patent [19]

Munday et al.

[11] Patent Number: 5,145,941
[45] Date of Patent: Sep. 8, 1992

[54] FLAME RESISTANT, LOW PILLING POLYESTER FIBER

[75] Inventors: Jerry T. Munday, Charlotte; Theodore D. Meiss, Matthews, both of N.C.

[73] Assignee: Hoechst Celanese Corporation, Somerville, N.J.

[21] Appl. No.: 796,280

[22] Filed: Nov. 22, 1991

Related U.S. Application Data

[63] Continuation-in-part of Ser. No. 640,132, Jan. 4, 1991.

[51] Int. Cl.$^5$ .................. C08G 63/68; C08G 79/02
[52] U.S. Cl. ...................... 528/287; 524/116; 524/117; 524/120; 524/133; 524/135; 524/708; 528/288
[58] Field of Search .............. 528/287, 288; 524/120, 524/117, 116, 133, 135, 708; 525/403, 409

[56] References Cited

U.S. PATENT DOCUMENTS

| | | | |
|---|---|---|---|
| Re. 30,783 | 10/1981 | Kleiner et al. | 528/287 |
| 3,865,783 | 2/1975 | Clutter | 524/116 |
| 4,397,973 | 8/1983 | Scott et al. | 524/114 |

*Primary Examiner*—John Kight, III.
*Assistant Examiner*—Shelley Wright
*Attorney, Agent, or Firm*—Philip P. McCann

[57] ABSTRACT

The invention is a polyester and a method for producing a polyester fiber which has a combination of flame resistance and low pilling properties. The method comprises forming a polyester fiber made from a blend of two polyester polymers, one polyester polymer containing an oxysilicon compound and the second polyester polymer containing pentaerythritol and a phosphinic acid in the amount between 0.5 and 20 mole percent of the terephthalate acid and monomer. In particular, the invention also comprises the enhanced fiber formed by the process, as well as the fabrics having a pilling of about 3 to less than 5 as measured in accordance with ASTM D-3512-82.

16 Claims, No Drawings

FLAME RESISTANT, LOW PILLING POLYESTER FIBER

FIELD OF THE INVENTION

This patent application is a continuation-in-part of patent application Ser. No. 07/640,132 filed Jan. 4, 1991.

The present invention relates to polyester fibers and their use in textile applications, and in particular relates to an enhanced polyester fiber material having a combination of flame resistance and low pilling.

BACKGROUND OF THE INVENTION

Polyester has long been recognized as a desirable material for textile applications including garments, upholstery and numerous other uses. The processes for manufacture of polyester are relatively well known and straight forward to those knowledgeable in the art, and fibers made from polyester can be appropriately woven or knitted to form textile fabrics. Polyester fibers can be blended with other fibers such as wool or cotton to produce fabrics which have the enhanced strength, durability and memory aspects of polyester and retaining many of the desired qualities of the natural fiber with which the polyester is blended.

As with any fiber, the particular polyester fiber from which any given fabric is formed must have properties suitable for end use of the fabric. In many applications such as sleepwear fabrics, draperies, and bedspreads, for example, it is desirable the textile fabric have the property of flame resistance. Flame resistant fabrics are defined as fabrics that will self extinguish when an ignition source is removed. Requirements are set forth in various tests including the NFPA 701-1977.

One technique for attaining the flame resistance of fabrics of polyester fiber is to modify the polyester with carboxyphosphinic acids. Such modified polyester fibers and their use in fabrics are disclosed in U.S. Pat. Nos. 3,941,752; 4,033,936; and RE 30,783. In fact, these patents describe flame resistant linear polyesters made from modified polyesters consisting of dicarboxylic acid components and diol components and phosphorus containing chain members being structurally units of the formula

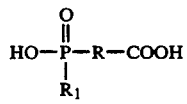

which constitute about 1-20 mole percent of the acid component of the polyester. In this formula R is the saturated open-chained or cyclic alkylene, arylene, or aralkylene having from 1-15, preferably from 2-10 carbon atoms and $R_1$ is an alkyl radical having up to 6 carbon atoms or an aryl radical or an arakyl radical as described in U.S. Pat. No. 3,941,752. Such modified polyester fibers are currently available from Hoechst Celanese Corporation.

Although fabrics containing polyester fibers as described above provide flame resistance, such synthetic fibers have an undesirable propensity upon prolonged use to exhibit small, compact groupings or entangled fibers (i.e., fuzzballs) on the fabric surface. Such fiber groupings commonly are termed "pills" and tend to form and to tenaciously adhere to the surface of the fabric as the fabric encounters surface abrasion during normal use. The aesthetic appearance of fabric accordingly may be adversely influenced by these relatively small groupings of entangled fibers which are retained on the surface of the fabric.

Heretofore, it has been believed that such pills can be traced to the relatively high strength of the synthetic fibers present in the fabric. For instance, the pills may be more or less permanently attached to the fabric surface by one or more synthetic polymer fibers extending out of the fabric which will resist breakage as the surface abrasion continues. This theory of pill formation is supported by the significant lower level of the retention of undesired fuzzballs on the surface of the fabric consisting solely of cotton fibers following the same surface abrasion conditions. It is believed that the entangled cotton fibers which form at the surface of the fabric readily break away since the cotton fibers are of an inherently lower strength.

This pilling problem may be observed in fabrics formed in whole or in part from polyethylene terephthalate (PET) fibers. Pills commonly are observed on the fabric formed from blends of cotton and PET staple fibers following use in service and during the cleaning process including laundering or dry cleaning. While the pills may be observed in fabrics having a wide variety of construction, they are more commonly observed on loosely constructed fabrics, particularly knitted fabrics.

One approach heretofore proposed to reduce the pilling of fabrics is to reduce the tenacity (or strength) of the PET fibers by using a low molecular weight (measured as intrinsic viscosity) PET polymer. Low intrinsic viscosity provides a general indication of reduced polymeric chain length and leads to fibers having a lesser strength. Accordingly, when such entangled fibers become free on the surface of the fabric following abrasion, the fibers tend to cleanly break away and not hold a fuzzball at the surface of the fabric.

It has been found, however, that when this approach is followed, it is more difficult initially to form and process the PET into a fabric using standard processing conditions because of the reduced tenacity. Such reduced tenacity can lead to a premature fiber breakage and processing disadvantages. These disadvantages have been overcome by gentler textile processing conditions. However, it has also been known that intrinsic viscosity reduction does not resolve the problem of low pilling to the satisfaction desired in the market.

It is also well known to chain branch polyester polymers in order to reduce pilling in the fabric. Chain branching of polyester fibers can be accomplished by inclusion of chain branching agents such as tetrafunctional chain branching agents, in particular, pentaerythritol and tetraethyl orthosilicate.

U.S. Pat. No. 3,576,773 discloses low pilling PET fibers containing trifunctional or tetrafunctional branching agents. Pentaerythritol is listed as a branching agent and is shown used in Example 5. U.S. Pat. No. 3,335,211 discloses low pilling PET fibers made in the presence of a polycondensation catalyst of antimony or titanium and adding an oxysilicon compound prior to melt spinning such as tetraethyl orthosilicate. Although it is recognized that trifunctional and tetrafunctional branching agents may be used to overcome pilling of PET fibers, inclusion of such branching agents in flame resistant polyester fibers at normal processing intrinsic viscosities of polyester has been found not to achieve the desired low pilling.

There remains a need to develop a processable polyester fiber having flame resistance and low pilling properties while also maintaining the other properties desired in the resulting fabric, especially the aesthetic properties of the fabric resulting from the polyester fiber.

SUMMARY OF THE INVENTION

It is therefore an object of the present invention to provide a polyester fiber and a method for producing the polyester fiber which has a combination of flame resistance and low pilling properties. The polyester fiber comprises the blended product of the following two polymers: a) a first polymer consisting essentially of a dicarboxylic acid or a lower alkyl ester thereof, a diol, and an oxysilicon compound; and b) a second polymer consisting essentially of a dicarboxylic acid or a lower alkyl ester thereof, a diol, pentaerythritol in the amount from about 100 to about 1,000 ppm of the dicarboxylic acid for a lower alkyl ester thereof, and a carboxyphosphinic acid monomer, said monomer being used in an amount from about 0.5 to about 20 mole percent based on a total amount of dicarboxylic acid or lower alkyl ester thereof and monomer, said monomer of the general formula

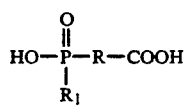

or a lower alkyl ester or cyclic anhydride of same monomer wherein R is a saturated, open chain or cyclic alkylene, arylene or aralkylene having one to 15 carbon atoms, and $R_1$ of the formula is alkyl having up to 6 carbon atoms or an arakyl, wherein the blended product has an intrinsic viscosity based on dichloroacetic acid at 25° less than about 0.55 deciliters/gm.

The foregoing and other objects, advantages and features of the invention, and the manner in which the same are accomplished will become more readily apparent upon consideration of the following detailed description of the invention, taken in conjunction with the examples which illustrate exemplary embodiments.

DETAILED DESCRIPTION OF THE PREFERRED EMBODIMENT

The invention comprises forming a polyester fiber comprising a polyester polymer containing oxysilicon compound and a second polyester polymer containing pentaerythritol and a flame resistant carboxy-phosphinic acid monomer being added in the amount of about 0.5 to about 20 mole percent based on a total amount of the diacarboxylic acid or lower alkyl ester and a monomer. The mixture of the polyester polymers of the invention has an intrinsic viscosity based on dichloroacetic acid at 25° C. of less than about 0.55 deciliters/gm.

Dicarboxylic acids suitable for the present invention include acids having the formula

wherein R is selected from the group consisting of —$(CH_2)_n$— where n is from 2 to 12,

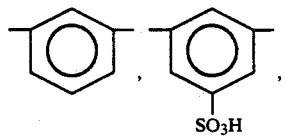

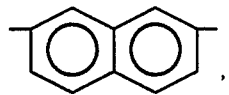

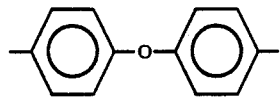

Suitable dicarboxylic acids include terephthalic acid, isophthalic acid, adipic acid and naphthalic acid.

It is well known in the art that suitable lower dialkyl esters of the TA may include in addition to DMT, diethyl terephthalate, dipropyl terephthalate, dibutyl terephthalate, dialkyl naphthalates such as 2.6 dimethyl naphthalate, or mixtures of two or more of these. The glycol may comprise in addition to ethylene glycol, diethylene glycol, polyethylene glycol, blends of ethylene glycol and propane and/or butane diol, or mixtures of two or more of these. Although the embodiment is directed to polyethylene terephthalate, a specific type of polyester, this is not to be taken as a limitation, but as one embodiment of the present invention.

As is known to those familiar with the commercial production of polyester, the polyester polymer can be formed from a starting mixture of terephthalic acid and ethylene glycol or from dimethyl terephthalate and ethylene glycol. The polyester may be manufactured using a batch process or a continuous process. The reaction proceeds through the well known steps of esterification and condensation to form polyethylene terephthalate, commonly referred to as PET. A number of catalysts or other additives have been found to be useful in promoting either the esterification or condensation reactions, or in adding certain properties to the polyester. For example, manganese is used as a catalyst for esterification, antimony compounds are commonly used to catalyze the condensation reaction and inorganic compounds such as titanium dioxide ($TiO_2$) are commonly added as delustrants or for other similar purposes In the ester interchange route, dimethyl terephthalate (DMT) and ethylene glycol (EG) are typically reacted in the presence of a catalyst (manganese) at atmospheric pressure and at a temperature of from about 180° C. to 230° C. In the presence of the catalyst, these components undergo ester interchange to yield two intermediate monomers and methanol. The reaction which is conveniently done with about 1 mole of DMT, and 1.8 to 2.2 moles of EG, is reversible and is carried to completion by removing methanol formed. During the ester interchange, the two intermediate monomers are the substantial majority product (not considering the methanol), along with small amounts of low molecular weight oligomers.

The monomers are then polymerized by a polycondensation reaction, where the temperature is raised to about 280° C. to about 310° C. and the pressure is reduced to below 1 mm of mercury vacuum and in the presence of a suitable polymerization catalyst (antimony). From this reaction, polyethylene terephthalate and ethylene glycol are formed. Because the reaction is reversible, the glycol is removed as it is evolved, thus forcing the reaction toward the formation of the polyester.

The polyester at temperatures of 280° to 310° C. is a viscous liquid which is forced through a spinneret to form individual filaments; a process generally referred to in the art as "spinning". The spun filaments are subsequently drawn, heat set, crimped, dried and cut with appropriate lubricating finishes added in a conventional manner. It will be understood by those familiar with textile manufacturing in general and synthetic fiber manufacture, in particular, that the word "spinning" has two connotations in the art, the first meaning being a term used to describe the manufacture of fiber from a polymer melt, and the second being the twisting of the fibers together—natural, synthetic or blended to form spun yarn. Both these terms will be used herein in the conventional sense the polyester polymer of the present invention is produced.

The polyester polymer of the present invention is produced by previously described production methods for polyester, i.e., esterification followed by polymerization via polycondensation. A batch process is generally employed, and catalyst and/or other typical additives may be employed. It will be understood that the presence or absence of such materials does not affect the essential techniques or results of the present invention, although they may modify or enhance the polyester monomer in the same desirable manner as for polyester itself. It is noted and described hereinafter the process is tailored to the intrinsic viscosity of the polyester polymer. Intrinsic viscosities as used herein require lower spinning temperatures than those temperatures required for polyesters of higher intrinsic viscosity.

The present invention is directed to polyester fibers that also include flame resistant carboxyphosphinic acid monomer and the chain branching agent. The flame resistant carboxyphosphinic acid monomers and their use in polyester fibers are described in U.S. Pat. Nos. 3,941,752, 4,033,936; and RE 30,783 which are incorporated by reference.

The carboxyphosphinic acid monomers have the general structural formula:

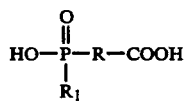

wherein R is a saturated, open-chained or cyclic alkylene, arylene or aralkylene, having from 1 to 15, preferably 2 to 10 carbon atoms, and $R_1$ is an alkyl radical having up to six carbon atoms, an aryl radical or an aralykyl radical. Preferred phosphorous-containing chain members are the structural units of the above formula with R being $C_2H_4$ or $C_6H_4$ and $R_1$ being $CH_3$ or $C_6H_5$ or $C_4H_9$.

When manufacturing the polyesters according to the process of the present invention, the carboxyphosphinic acids may be used as free acids, their acids or their cyclic anhydrides. Since above all the cyclic anhydrides (2,5-dioxo-1,2-oxaphospholanes) are easily obtainable, the use of these compounds is advantageous. However, as described in the U.S. Pat. No. 4,033,936 there are difficulties in using the cyclic anhydrides of the carboxyphosphinic acids. These difficulties were overcome, as disclosed in the '936 patent by previously dissolving the oxaphospholane at elevated temperatures in a diol suitable for the polyester manufacture, and subsequently adding this solution to the polyester manufacturing batch.

When the cyclic anhydrides are dissolved in a suitable diol, the ring is opened with the addition of 1 mole of diol. The dissolving temperature depends of course on the nature of he oxaphospholane and the diol; generally, it is in a range of from about 50° C. to 150° C. When 2-methyl-2,5-dioxo-1, 2-oxapholane is to be dissolved, the most advantageous temperature is about 105° C. to 130° C. The weight ratio of diol: oxaphospholane may widely vary. A lower limit is set only by the necessity of providing enough diol for the reaction, that is, at least 1 mole of diol per mole of anhydride, and of ensuring a sufficient viscosity of the solution. An upper limit of the diol amount is set by economic considerations only, since excess glycol has to be distilled off later on.

The carboxyphosphinic acid semi-esters formed by dissolution of the cyclic anhydrides in the diols, for example 2-carboxyethylmethylphosphinic acid-ethylene glycol ester, are substances that are viscous liquids at room temperature which do not decompose or to an insignificant extent only at the elevated temperatures usually required for polyester manufacture, so that undesirable discoloration does not occur. The semi-esters are incorporated into the polyester chain molecules in the same manner as the other phosphorus containing modification agents used. The oxaphospholane solution in the corresponding diol is added to the polyester manufacturing batch in the same manner as is described for the carboxyphosphinic acids and their derivatives, namely, in case of reaction in known manner of starting substances usual for the manufacture of high molecular weight, especially fiber and film-forming, linear polyesters, before or during the polycondensation, or just before it is complete. The amount of carboxyphosphinic acid component should be from 0.5 to 20 mole % of the total acid components.

Methods of preparing the carboxyphosphinic acid monomers and incorporation into polyester polymers are described in U.S. Pat. No. 3,941,752 and RE 30,783. The process of making the flame resistant polyesters from phosphorus containing compounds are further described in U.S. Pat. No. 4,033,936. In particular, in the described process, cyclic anhydride of the above phosphorus compounds is employed wherein the cyclic anhydride is dissolved at elevated temperatures in a diol solvent suitable for the polyester manufacture to form a carboxy-phosphinic acid semester of said diol solvent in reacting said semester with the dicarboxylic acid and the diol reactant to form the polyester.

Pentaerythritol is a well known commercially available compound used in the manufacture of polyester. Preferable amounts are from 500 to 1400 ppm of the dicarboxylic acid or a lower alkyl ester thereof in the second polymer of pentaerythritol is used.

In view of the foregoing, an example of the process for making flame resistant low pilling polyester of the present invention will be described in detail.

A batch process of the present invention starts with esterification performed at atmospheric pressure and at 180° to 220° C. The reactor is loaded with dimethyl terephthalate, ethylene glycol and a catalyst as is conventionally carried out in a customary batch polyester process. After esterification is completed, the carboxyphosphinic acid and pentaerythritol are added or the hydrocarbyloxysilicon compound is added. Other additives such as delustrants (TiO$_2$), thermostabilizers, optical brighteners and/or bluing agents, etc., may be added at this initial stage. The polymerization stage is run at 280–300° C. at a strong vacuum of 0.3 to 3.0 mm Hg. The target intrinsic viscosity of the polymer is less than 0.55 deciliters/gm in the solvent base dichloracetic acid at 25° C. and preferably from about 0.45 to about 0.54 deciliters/gm.

Subsequently, the polymer is heated to 270° C. to 275° C. and spun into fibers according to methods well known in the art involving quenching, finish application and takeup.

Preferably, the polyester is prepared by spinning together two separate polymers, one containing pentaerythritol and phospholane and the other polymer containing the hydrocarbyloxysilicon compound. Two batches are prepared accordingly. Each batch starts with esterification performed at about 220° C. Each process starts with the esterification of dimethyl terephthalate ethylene glycol and a suitable catalyst After esterification is completed, to one batch is added pentaerythritol and phospholane, and to the second batch is added tetraethylorthosilicate (TES). Other additives, described above, are then added to each batch. Each batch is then polymerized in accordance with the above description.

Each batch is heated to from 270° C. to 275° C. and spun together into fibers according to methods well known in the art involving the steps of quenching, finish application and takeup.

Prior to spinning into fibers, the polymer is tested for intrinsic viscosity in dichloroacetic acid at 25° C. By definition, intrinsic viscosity is the value of the intercept at about zero concentration of the plot in [(relative viscosity)/concentration] versus concentration of polyester polymer in dichloroacetic acid at 25° C. The desired intrinsic viscosity is less than 0.55 deciliters/gm. Subsequent to the spinning operation the fibers are processed through a drawing process at heat setting temperatures to impart desired tensile properties in the filaments. In this regard, heat setting temperatures most preferred are generally greater than 120° C., and preferably from between about 125° and 140° C. These fibers are then cut into staple length. The cut staple fibers are processed into yarns which are subsequently converted into fabrics and then into various products including garments, draperies, bedspreads, etc.

The fabrics made according to the process generally have what is called low pilling characteristics. The fibers can be made into various fabrics which in turn are constructed into garments including, but not limited to, upholstery fabrics, draperies, and bed spreads The term "low pilling" or its equivalent means herein that the tested material obtains a value of 3 to 4 as defined as ASTM D-3512-82 entitled "Standard Test Method for Pilling Resistance and Other Related Surface Changes of Textile Fabrics: Random Tumble Pilling Tester Method". The value of 5 indicates no pill formation, whereas the values of less than 5 indicate various levels of pilling.

The following examples illustrate specific embodiments of the invention, but the invention is not limited to such examples.

EXPERIMENTAL PROCEDURE

Autoclave batches were prepared in which batches of roughly 70 kilograms of polymer for Example 1 were produced at approximately 2.5 to 1 mole ratio of ethylene glycol (EG) to DMT in a batch process. In each case, the autoclave was first charged with the raw materials including DMT, ethylene glycol, the catalysts, manganese acetate, cobalt and pentaerythritol.

During charging of the raw materials, the autoclave was subjected to an inert gas to aid in preventing oxidation. Generally, the autoclave was agitated with a stirrer to assure homogenous commingling of the raw materials. At the start of the ester interchange reaction (approximately when the reactor contents reached 155° C.), the flow of nitrogen gas was terminated. The autoclave temperature during ester interchange rose from approximately 155° to about 180° to 230° C. During the ester interchange the methanol was continuously removed to force the reaction toward the production of the monomer.

At this point of the reaction, the ester interchange reaction was substantially complete. To one batch pentaerythritol and phospholane solution was added and the slurry stirred for about five minutes. Then titanium dioxide was added and the slurry stirred for five minutes. Finally, a solution of PPA was added. To the second batch, TES was added and the slurry stirred for about five minutes Then titanium dioxide was added and the slurry stirred for five minutes. PPA was then added.

For Example 1, polycondensation was performed in the same autoclave. The catalyst antimony trioxide was added after ester interchange reaction. Vacuum-letdown was initiated and during this time the flow of nitrogen gas was once again terminated. During vacuum-let-down a vacuum is drawn on the autoclave until a vacuum of about 1.0 mm of mercury or lower is achieved. At the end of the vacuum-let-down, the autoclave was again heated to about 290° C. thereby initiating the polycondensation reaction. The polycondensation reaction proceeded until substantial completion, during which the glycol formed was removed.

Once the polyester was formed, the polyester was tested for intrinsic viscosity (IV), and tenacity expressed in grams per denier. The IV was tested at 25° C. using a dichloroacetic acid solvent.

EXAMPLE 1

Various polyester fibers were made to demonstrate the effect of the present invention on both pilling and flame resistance. Experiment 1 (control) was spun to have an IV of 0.60 deciliters per gram which was higher than that claimed in the present invention. In Experiment 1 also, pentaerythritol and phospholane was added. The pentaerythritol was added at 1,000 ppm of the DMT and the phospholane was added at 1.55%. In Experiment 2, two polymers were prepared, one containing pentaerythritol and phospholane and the second containing TES. The two polymers were blended to have an IV of 0.50 deciliters per gram. The polymer of Experiment 1 was made using 1,000 ppm pentaerythritol and 1.55% phospholane. The polyester fiber was used and incorporated in polyester fabric in a 5 shaft satin weave which was then measured for pilling and flame resistance. As is evidenced by the control Experiment 1, the fabric made from polyester having a higher IV was outside the scope of the present invention fails the pilling test, whereas fabrics made from IV's according to the present invention met the required pilling test, as well as the require flame resistance.

TABLE 1

|  | (control) Experiment 1 | Experiment 2 |
| --- | --- | --- |
| Penta ppm | 1000 | 128 |
| TES (%) | 0 | 0.27 |
| Phospholane weight (%) | 1.55 | 1.55 |
| Spinning Temperature °C. | 285° | 270° |
| IV in deciliters/gm | 0.60 | 0.50 |
| Tenacity (gm/denier) | 4.64 | 2.3 |
| Denier | 1.57 | 1.48 |
| Pilling after |  |  |
| 30 minutes | 1 | 4–5 |
| 60 minutes | 1 | 5 |
| Flame Resistance CharLink (inches) | 7.0 | 4.6 |
| After Flame Time (sec) | 0 | 1.1 |

That which is claimed is:

1. A flame resistant, low pilling polyester comprising the blended product of the following two polymers
    a) a first polymer consisting essentially of a dicarboxylic acid or a lower alkyl ester thereof, a diol, and an oxysilicon compound; and
    b) a second polymer consisting essentially of a dicarboxylic acid or a lower alkyl ester thereof, a diol, pentaerythritol in the amount from 100 to about 1,000 ppm of the dicarboxylic acid or a lower alkyl ester thereof, and a carboxyphosphinic acid monomer, said monomer being used in an amount of from 0.55 to 20 mole percent based on the total amount of dicarboxylic acid or lower alkyl ester thereof and monomer, said monomer of the general formula

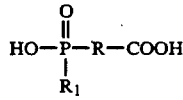

or a lower alkyl ester or cyclic anhydride of said monomer; wherein R is a saturated, open-chain or cyclic alkylene, arylene or aralkyl having one to 15 carbon atoms, and $R_1$ is an alkyl having up to 6 carbon atoms, aryl or aralkyl;
wherein the polycondensation product has an intrinsic viscosity of less than about 0.55 deciliters/gm in the solvent base dichloroacetic acid at 25° C.

2. A polyester of claim 1 wherein the blended product has from 1.5 to 20 mole percent of the carboxyphosphinic acid monomer contained therein.

3. A polyester of claim 1 wherein the blended product is a 50:50 blend of the first polymer and the second polymer.

4. A polyester according to claim 1 wherein R is $C_2H_4$ or benzyl and $R_1$ is $CH_3$, benzyl or butyl.

5. A polyester according to claim 1 wherein R is $C_2H_4$ and $R_1$ is methyl.

6. A polyester according to claim 1 wherein the units derived from dicarboxylic acid are essentially terephthalic acid units and the units derived from the diol are essentially units of a diol of the formula

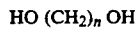

wherein n is 2 to 10, or the diol units are derived from 1,4-cyclohexanedimethanol.

7. A polyester according to claim 1 wherein the units derived from dicarboxylic acid are essentially terephthalic acid units and the units derived from diol are essentially ethylene glycol units.

8. A polyester according to claim 1 having an intrinsic viscosity in the solvent base dichloroacetic acid at 25° C. in the range of 0.40 to 0.55 deciliters/gm.

9. A polyester according to claim 6 wherein the oxysilicon compound has the formula $R[OSi(OR)_2]OR$ or wherein R is a radical such as methyl, ethyl, 2-hydroxyethyl, butyl, phenyl or mixed groups. A polyester according to claim 1 wherein said chain branching agent has a functionality of 4.

10. A polyester according to claim 9 wherein the lower alkyl ester of the dicarboxylic acid is dimethyl terephthalate, and the diol is ethylene glycol.

11. A garment made containing the flame resistant, low pilling polyester of claim 1.

12. A garment made containing the flame resistant, low pilling polyester of claim 10.

13. A flame resistant, low pilling polyester comprising the blended product of the following two polymers:
    a. a first polymer consisting essentially of dimethyl terephthalate, ethylene glycol and tetraethyl orthosilicate in the amount from about 0.1 to about 1.0 weight % of the dimethyl terephthalate; and
    b. a second polymer consisting essentially of dimethyl terephthalate, ethylene glycol, pentaerythritol in the amount from about 100 to about 1,000 ppm of the dicarboxylic acid or a lower alkyl ester thereof;
wherein the blended product has an intrinsic viscosity of less than 0.55 deciliters/gm in the solvent base dichloroacetic acid at 25° C.

14. A polyester of claim 13 wherein the blended product has from 1.5 to 20 mole percent of the phosphonic acid contained therein.

15. A polyester of claim 13 wherein the blended product is a 50:50 blend of the first polymer and the second polymer.

16. An article of manufacture made containing the flame resistant, low pilling polyester of claim 13.

* * * * *